United States Patent

[11] 3,556,226

| [72] | Inventors | Willie F. Brewer<br>Yazoo, Miss.;<br>Franklyn L. Dahlberg, Minden, La. |
|---|---|---|
| [21] | Appl. No. | 778,169 |
| [22] | Filed | Nov. 22, 1968 |
| [45] | Patented | Jan. 19, 1971 |
| [73] | Assignee | FMC Corporation<br>San Jose, Calif.<br>a corporation of Delaware |

[54] HYDRAULIC ROW MARKER
7 Claims, 7 Drawing Figs.

[52] U.S. Cl. .................................................. 172/130,
172/497
[51] Int. Cl. ..................................................... A01b 17/00
A01b 63/00
[50] Field of Search ........................................ 172/130,
126, 128, 127, 491, 132, 499, 497, 500, 494, 604,
465, 264, 204

[56] References Cited
UNITED STATES PATENTS

| 466,772 | 1/1892 | Clark | 172/604X |
| 883,244 | 3/1908 | Shrader | 172/132 |
| 958,567 | 5/1910 | Ulrich | 172/126 |
| 3,139,941 | 7/1964 | Graham et al. | 172/130 |
| 3,158,204 | 11/1964 | Martin | 172/126 |
| 3,250,333 | 5/1966 | Day | |

Primary Examiner—Robert E. Bagwill
Assistant Examiner—Stephen C. Pellegrino
Attorneys—F. W. Anderson and C. E. Tripp ABSTRACT: Position indicating furrows are formed by means of a pair of marker discs and arms extended laterally and alternately from either side of a carrier attached behind a tractor during tilling or planting operations. The marker arms and discs are raised hydraulically and automatically latched in the stowed position. Upon release they lower to the working position and are forced against the ground by means of a variable moment loading device. When in the operating position the marker disc and arm are free of hydraulic lifting means thereby enabling them to maintain positive contact with the ground over rough terrain. When employed with marker discs having scalloped rims, the marker apparatus forms clear indicating furrows in hard or trashy soil conditions.

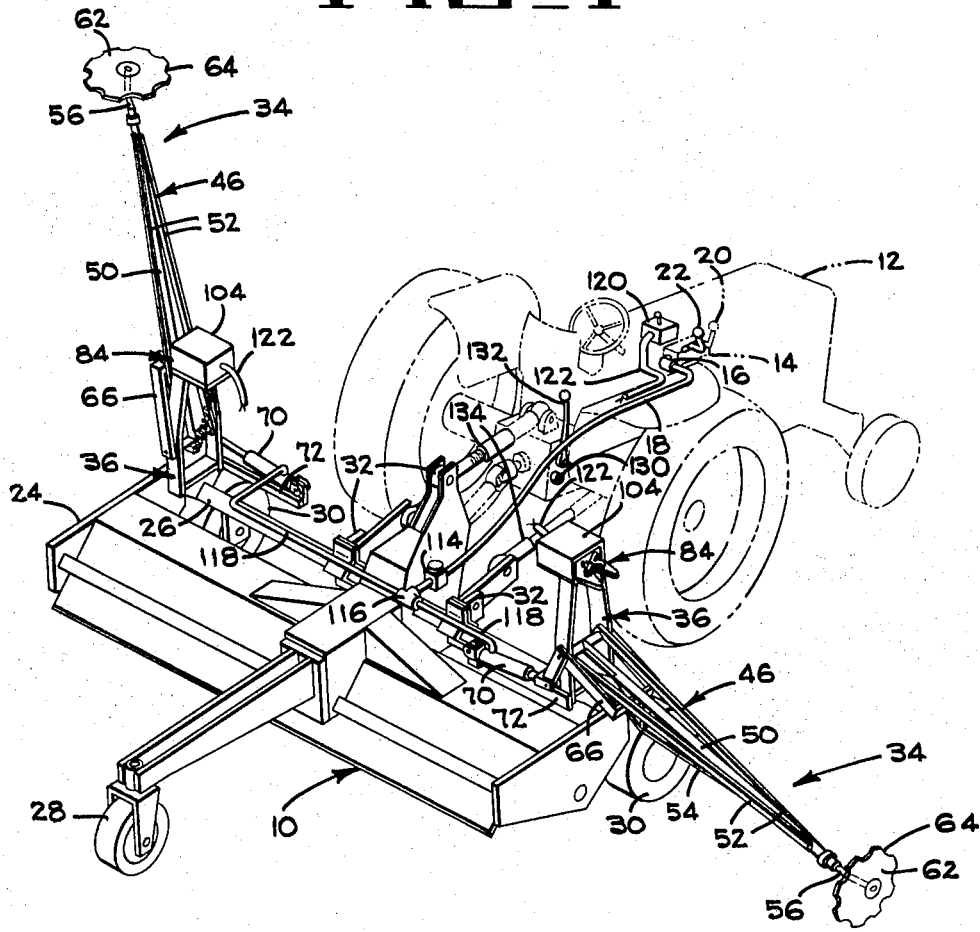
PATENTED JAN 19 1971
3,556,226
SHEET 1 OF 4
FIG_1
INVENTORS.
WILLIE F. BREWER
FRANKLYN L. DAHLBERG
BY F. W. Anderson
C. E. Tripp
ATTORNEYS

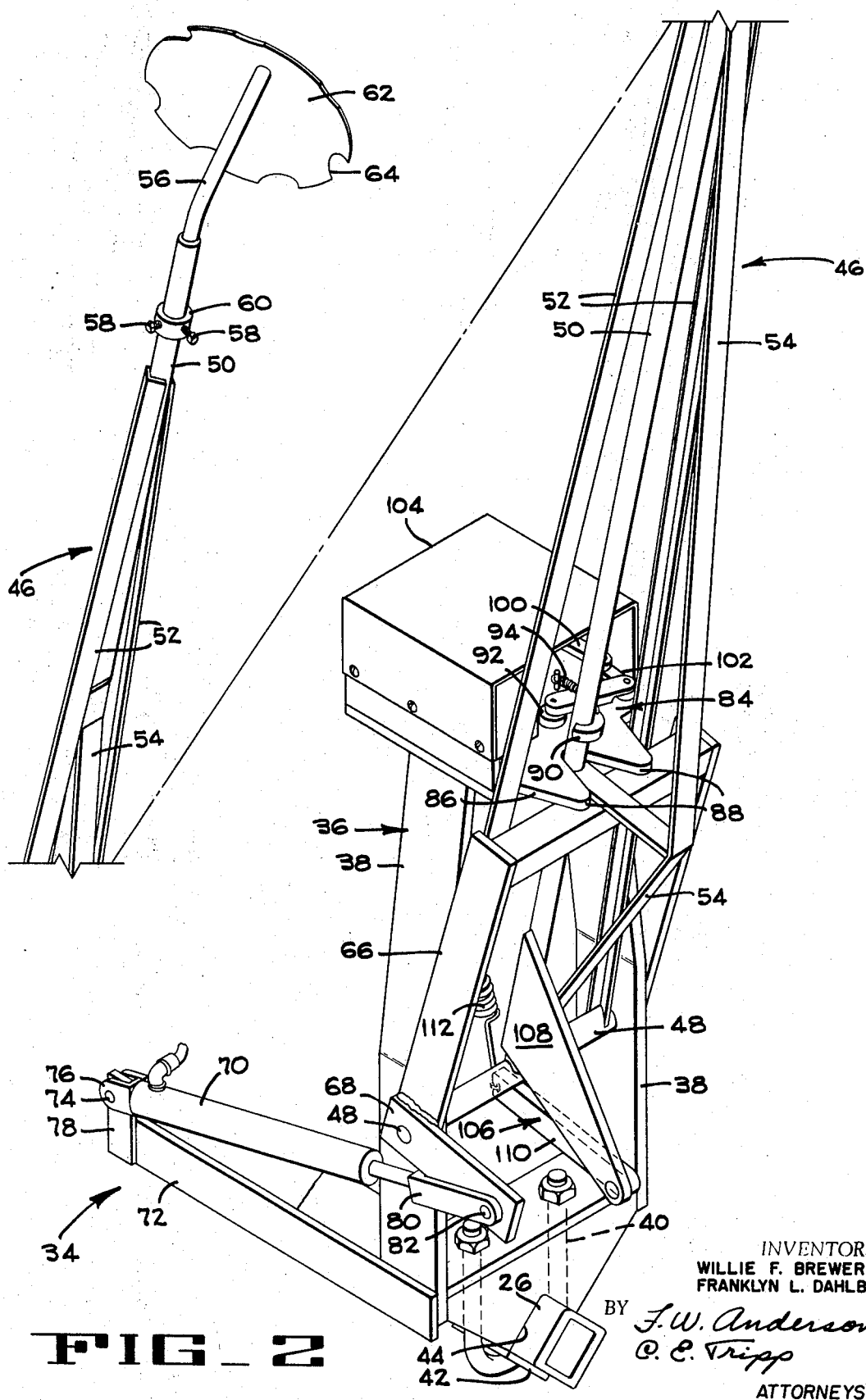

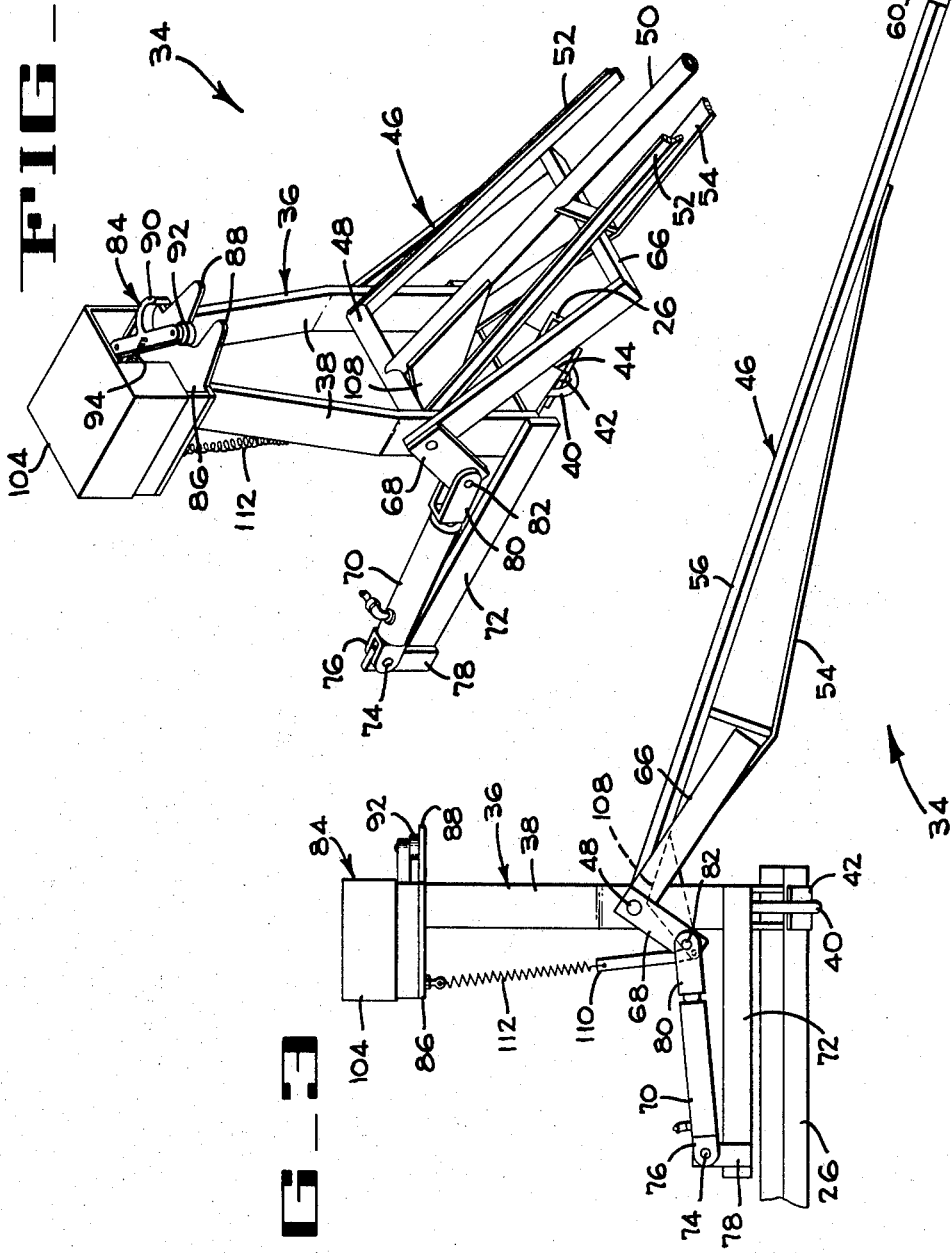

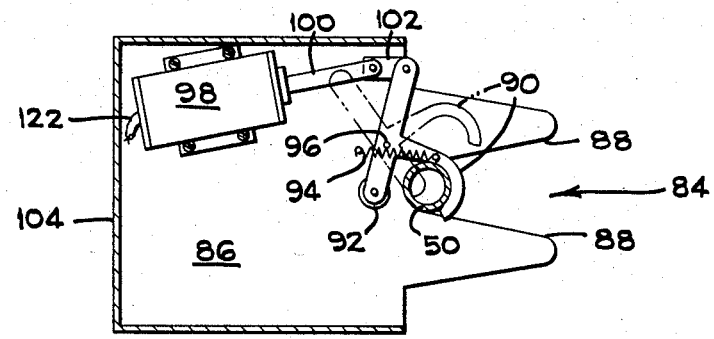
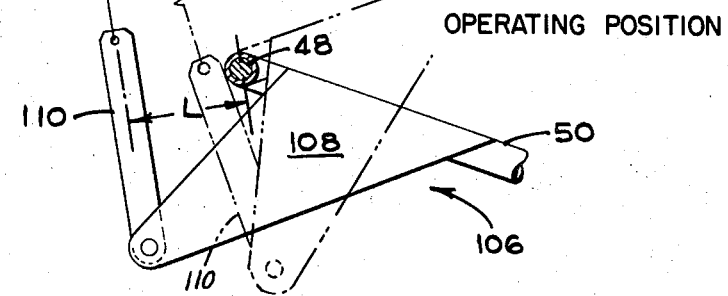
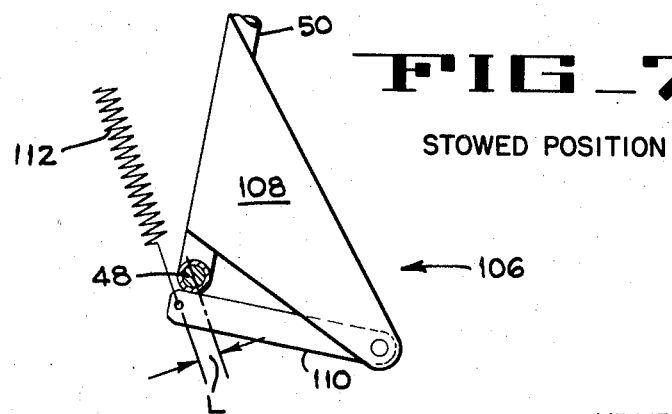

HYDRAULIC ROW MARKER

BACKGROUND OF THE INVENTION

1. Field of the Invention

The present invention relates to agricultural tilling and planting equipment and in particular to a hydraulically operated row marker employed to form position-indicating furrows which the tractor operator follows on successive passes across a field to be tilled or planted.

2. Description of the Prior Art

In row marker described by Day in U.S. Pat. No. 3,250,333, the row marker arms are raised by single acting hydraulic cylinders attached directly thereto and retained in the upward position by latches which are released by pull cords. The hydraulic cylinders are controlled by a three way valve. The first two positions control the hydraulic flow to either of the cylinders and the third position allows flow of the fluid from both cylinders to drain back into the reservoir. The Martin row marker, U.S. Pat. No. 3,158,204, describes a similarly constructed hydraulically actuated apparatus being controlled by two hydraulic valves. The first is a conventional control valve normally found on tractors which is movable to on, hold and off positions regulating the flow of fluid pressure to the second valve whereby the fluid pressure may be directed to either the left, right or both hydraulic cylinders. The holding position of the first valve in the Martin apparatus is used to perform the same function as performed by the latches in the Day patent, namely, retaining the marker arms in the raised position. In both the previous patents when the marker arm is unlatched or valve is moved to appropriate position the marker arms lower through the force of gravity returning fluid from the cylinders to the hydraulic reservoir until the markers engage the ground.

Spring-tensioning devices employed on marker arms are described in patents by Shrader, U.S. Pat. No. 883,244 and Ulrich U.S. Pat. No. 958,567. The application of the tensioning springs in these apparatuses are twofold; first, to engage the marker against the ground and second to act as an overcenter latch spring retaining the marker arms when manually raised to the stowed position.

SUMMARY OF THE INVENTION

The present invention relates to an improved hydraulically operated row-marking apparatus consisting of two marker arms pivotally mounted on either side of and extending laterally from a tool bar or other suitable mounting point. Upon engagement by the operator of the control valve of the remote hydraulic system commonly found on tractors, fluid pressure is directed to two single-acting hydraulic cylinders, raising boom cradles which engage the underside of both of the marker arms, raising the arms from a lowered working position to a stowed position. The marker arms engage and are retained by overcenter latches. Upon activation of a switch at the operator's station, the hydraulic control having been disengaged, a release solenoid causes the latch to open, ejecting the associated marker arm outward, allowing the marker arm and cradle to rotate downward due to their weight, forcing the hydraulic fluid back to the reservoir of the hydraulic system. The cradle continues to lower, freeing the marker arm of any downward resistance from the cradle in the operating range of the marker arm. A variable moment-loading device is attached to the marker arm to force the marker disc attached to said arm against the ground, and the device is so constructed that the downward moment is at a maximum in the operating range of the marker arm. As the marker arm is raised to the stowed position, the moment created by the loading device is rapidly diminished as the arm rotates above the operating range.

Both of the apparatus described by Day and Martin have the disadvantage that, when the tractor and/or the marking disc are moving over irregular terrain, the hydraulic cylinder directly attached to the marker arm is forced to extend and retract, the result of which being that the marker disc is lifted from the ground for a period of time. This problem is eliminated by the employment of a boom cradle not directly connected to the marker arm thereby eliminating the hydraulic resistance. The hydraulic operation also differs from that of previous row markers in that the hydraulic cylinders are dependently connected, thereby simplifying operation.

The variable moment-loading device employed in the present invention differs from the spring-loading devices previously described by Shrader and Ulrich in that it is not of the overcenter type and is not used to retain the marker arms in the raised position. It also has the additional advantage that the downward force of the loading device is quickly reduced to a minimum when the marker arm is raised, thereby reducing the lifting loads and allowing the use of a heavier tensioning spring.

By employing a rotatably mounted marker disc having a scalloped rim in combination with the variable moment-loading device, increased effectiveness of row marking is attained when the disc moves over the unimproved soil and over fields containing crop residue. The increased effectiveness results from the cooperative action of the downward force on the marker arm and the improved cutting action of the scalloped marker disc.

Accordingly, it is an object of the present invention to provide an improved mechanism for supporting a marking arm from its carrier.

Another object is to provide a marking arm-actuating mechanism wherein the power mechanism for lifting the arm is inactive during normal operation of the arm.

Another object is to provide an improved marker disc.

BRIEF DESCRIPTION OF THE DRAWINGS

FIG. 1 is a perspective view of the row marker mounted on a carrier drawn by a tractor shown in phantom line.

FIG. 2 is an enlarged perspective view of a marker unit with the arm in the stowed position.

FIG. 3 is a rear view of a marker unit with the arm in the operating position.

FIG. 4 is a partial perspective view of the marker unit.

FIG. 5 is a plan view of the latch mechanism with the cover removed.

FIG. 6 is a rear view of the moment-loading device in the operating position.

FIG. 7 is similar to FIG. 6 showing the moment-loading device in the stowed position.

DESCRIPTION OF THE PREFERRED EMBODIMENT

Referring to the drawings, there is shown in FIG. 1 a commonly known carrier 10 for the transport and support of cultivating and planting attachments or the like mounted on the rear of a tractor 12.

The tractor 12 is of the usual type used in agriculture, having an electric and hydraulic system. The portion of the hydraulic system being relevant to the present invention is commonly referred to as the remote system and includes a control valve 14 and a fitting 16 for the attachment of a hydraulic line 18. The control valve 14 has a minimum of two control positions, the on-position 20 shown in phantom line being the position at which the fluid pressure is supplied to the fitting 16. When the valve is in the off-position 22 fluid is allowed to flow back from the fitting 16 to the hydraulic reservoir (not shown).

The carrier 10 may be of the type described in the Brewer application Ser. No. 409,051 and comprises a framework 24 containing a tool bar 26 and other members for mounting agricultural attachments, supported in the rear by a caster wheel 28. The front of the framework 24 is supported by the usual depth control wheels 30 and is connected to the tractor 12 by a three-point hitch arrangement 32.

The marker apparatus of the present invention is comprised of two substantially identical marker units 34 mounted on either end of the tool bar 26 which extends normal to the longitudinal axis of the tractor and projects laterally from each side thereof.

The marker units 34 are employed to form position-indicating furrows enabling the tractor operator to steer the tractor 12 in straight parallel adjacent paths across a field while cultivating or performing similar tasks. The marker units 34 are actuated alternately as the tractor is driven back and forth across the field.

As seen in FIGS. 2 and 4, an A frame 36 having side members 38 is mounted on the carrier tool bar 26 by means of a U-bolt 40 and a V-shaped pad 42. The pad and U-bolt clamp a V-shaped notch 44 in the frame 36 against the tool bar 26. A marker arm 46 is attached to an axle 48 which is mounted between the side members 38 of the frame.

The marker arm 46 is comprised of a central tubular boom 50 that is stiffened by diagonal braces 52. In order to minimize bending of the boom 50 in the vertical plane, a stiffening support 54 is attached beneath the boom. The central boom 50 and diagonal braces 52 are welded to the axle 48 that is rotatably mounted on the side members 38 of the A frame 36 FIGS. 2 and 4).

An axle 56 (FIG. 2 ) is mounted in the outer end of the central boom 50 and is retained by set screws 58 in a collar 60, such that it can be adjusted in length and rotated to vary the bite of a marker disc 62.

The marker disc is saucer shaped and has a scalloped rim 64. The disc is rotatably mounted on the outer end of the axle 56 and functions as an earth-working tool. The scalloped rim 64 on the disc improves the cutting action of the disc, especially over hard or trashy soil.

A U-shaped cradle 66 (FIGS. 3 and 4) is used to raise the marker arm 46 from the lowered position shown by the right marker arm (FIG. 1) to the stowed or raised position illustrated by the left arm marker arm. The cradle 66 is rotatably mounted on reduced ends of axle 48 which protrudes through the side members 38. The cradle extends across and beneath the central boom 50 and diagonal braces 52 and is free to rotate between them and the lower stiffener 54 as seen in FIG. 3. The cradle is actuated through a crank 68 which is actuated by a hydraulic cylinder 70.

The base end of the hydraulic cylinder 70 is attached to a support 72, that is a part of the A frame 36, by means of a pivot pin 74 that extends through a clevis 76 and a lug 78. The rod end of the hydraulic cylinder is attached to the crank 68 by a clevis 80 and a pin 82.

A latching mechanism 84 (FIG. 5) is provided to hold the marker arm 46 in the stowed position and is mounted on a base plate 86 which is attached to the frame 36. The base plate has centering guides 88 which insure proper alignment between the boom 50 and a latch 90. As the marker arm is raised, the boom engages a latch roller 92 forcing it inward. As the line of action of a latch spring 94 passes over the center of a latch pivot 96, the latch closes due to the force of the spring, thus retaining the boom. When activated a release solenoid 98 mounted on plate 86 withdraws a solenoid shaft 100 and an intermediate link 102, thereby pivoting the latch counterclockwise against the action of the spring 94. The spring 94, upon being moved overcenter, forces the latch roller 92 against the boom, ejecting it outward from the latch mechanism and initiating its downward motion. A removable cover 104 (FIG. 2) is mounted over the latch mechanism to protect it from damage and the elements.

A variable moment-loading device 106 (FIGS. 6 and 7) is comprised of a lever 108 mounted on the marker boom 50. One end of a link 110 is pivotally attached to the lever 108 and the other end attaches to a tension spring 112 that is connected between the link 110 and the latch assembly base plate 86. The spring 112 is attached to the base plate 86 such that the tension can be adjusted (FIG. 3) and acts on the marker arm in the following manner. When the marker arm 46 is in the working position as shown in FIG. 3, the downward moment exerted on the marker arm is at a maximum. FIG. 6 shows the position of the moment-loading device when the marker arm is in the downward or operating range. As seen in FIG. 6, the lever arm L between the line of action of the link 110 and the center of axle 48 is near maximum. As the marker arm 46 is raised toward the stowed position (FIG. 2) the force required to raise the arm 46 against spring 112 decreases rapidly to a minimum value as the marker arm rotates above the operating range to an intermediate position shown in phantom lines wherein the link 110 abuts against the axle 48. Further upward rotation of the marker arm then rotates the link about the axle 48. This is illustrated in FIG. 7 showing the position of the moment-loading device when the marker arm is in the stowed position. The lever arm L, as shown in FIG. 7, is at a minimum and therefore the downward moment exerted on the marker arm is also at a minimum. The effective length of the lever arm L (FIG. 6) is decreased as link 110 swings inwardly toward axle 48 until it strikes same, at which time the lever arm is substantially at a minimum. Continued upward rotation of the marker arm merely swings the link around the axle 48, as shown in FIG. 7, maintaining the lever arm and downward moment on the marker arm substantially at a minimum.

Conversely, when the marker arm moves downwardly in its operating range near the ground, the lever arm L and the resulting downward moment increase. This increase is obtained when a wheel of the mobile carrier 10, on the side of the marker arm in use, is lifted due to the unevenness of the ground or when the marker disc 62 encounters a depression.

Hydraulic fluid under pressure is simultaneously supplied to both boom elevating hydraulic cylinders 70 from the remote hydraulic system of the tractor previously described. Line 18 transmits hydraulic pressure to the cylinders through an adjustable compensating valve 114 mounted on the carrier 10. The compensating valve controls the rate of flow of the hydraulic fluid and determines the lifting speed of the row markers. A T-fitting 116 divides the flow from the line 18 between two branch lines 118 leading to each hydraulic cylinder 70. The compensating valve 114 is adjusted to set the lifting speed of the row markers so that they snap crisply upward into the latch mechanism 84.

A two-way self-centering toggle switch 120 for actuating the latch release solenoids 98, is conveniently mounted near the tractor controls as seen in FIG. 1. The switch 120 is suitably connected to the tractor electrical system, such that power is supplied when the ignition of the tractor is in the on position. An electrical cable 122 is connected to the switch and is routed adjacent to the previously described hydraulic lines 18 and 118 to the marker units 36 where the cable attaches to the release solenoids 98. As switch 120 is moved to either side of the center position, the appropriate row marker arm is released.

OPERATION

In describing the operation of the marker apparatus it is assumed that the marker arms are in the positions as shown in FIG. 1 and that the hydraulic control valve is in the disengaged position 22. As the tractor operator reaches the end of a row, he moves the hydraulic control on the tractor to the engaged position 20, thereby supplying hydraulic pressure to both cylinders 70 and raising the right side marker arm from its working position to the stowed position where it is automatically latched. After the latch is engaged, the hydraulic control is moved to the disengaged position 22. Upon completing the turn at the end of the row, the left side marker arm is released by activating switch 120. The marker arm rotates downwardly due to its own weight, simultaneously acting on the boom cradle 66 which forces the hydraulic fluid from the cylinder 70 back to the reservoir. As the marker arm reaches the operating range, the variable moment-loading device exerts an additional downward moment on the marker arm forcing the disc firmly against the ground. The boom cradle continues its downward movement against the hydraulic cylinder and the resistance of the hydraulic fluid to flow, until the cradle comes to rest against the lower stiffening member 54 of the boom. When the tractor and/or marker disc move over irregularities on the ground, causing the marker arm to move up and down, the marker arm is free of the boom cradle and the attached hydraulic cylinder insuring continuous contact with the ground. The moment-loading device exerts a sufficient force for the marker disc to form a clear uninterrupted furrow.

The marker apparatus is particularly effective when operating over hard untilled ground, containing trash and stubble from a previous crop such as in double cropping where tilling and planning operations are accomplished concurrently in one pass over the field with no prior ground preparation. Under these conditions, the combined effect of the moment-loading device forcing the marker arm and disc against the soil and the scalloped rim of the marker disc result in increased effectiveness as the marker disc bites into the ground and cuts through trash etc. as it rotates about axle 56.

In tractors of the type having hydraulically actuated hitch mechanisms, the fitting 16 on line 18 may be attached to a hydraulic fitting 130 seen in FIG. 1. When a hitch control lever 132 is actuated to raise the hitch linkage 134 hydraulic pressure is simultaneously applied to fitting 130.

In operation, such as when the tractor reaches the end of a row, the operator actuates the control lever 132 to lift the front of the carrier 10, disengaging the cultivating attachments. Hydraulic pressure is supplied to line 18 through fitting 130 which simultaneously raises the marker arm 46 as the carrier 10 is lifted by the hydraulically actuated links 134.

Upon completing the turn at the end of the row, the operator returns the hitch control 132 to its original position cutting off the hydraulic pressure and the hitch links 134 return to their normal operating position. The appropriate marker arm 46 may now be lowered by actuating switch 120, the arm being free to lower since the hydraulic pressure to line 18 has also been cut off.

The latter method of operation reduces the number of controls which must be actuated by the operator when employing cultivating attachments which require a hydraulically actuated hitch in conjunction with the row marker of the present invention.

Although the best mode contemplated for carrying out the present invention has been herein shown and described, it will be apparent that modification and variation may be made without departing from what is regarded to be the subject matter of the invention as set forth in the appended claims. Having completed a detailed description of the invention so that those skilled in the art could practice the same,

We claim:

1. A row marker apparatus adapted to be used with a mobile carrier of the type having a hydraulic system and means for mounting attachments, comprising a frame mounted on the mobile carrier, a marker arm, a marker disc mounted on the outer end of said marker arm, means for pivotally mounting said marker arm on said frame for movement between a working position and a stowed position, a hydraulic cylinder pivotally mounted at one end on said frame, means operably connecting said hydraulic cylinder to the hydraulic system of the mobile carrier, lifting means pivotally mounted on said frame for motion independent of said marker arm and pivotally connected to the other end of said hydraulic cylinder, said lifting means engaging and raising said marker arm from the working position to the stowed position when fluid pressure is applied to actuate said hydraulic cylinder in one direction, and means for causing withdrawal of said lifting means from engagement with said marker arm for accommodating free downward movement of said arm in the working position when said actuating pressure on the hydraulic cylinder is released.

2. The apparatus of claim 1, in which said lifting and withdrawal means comprises a cradle pivotally mounted on the same axis as the marker arm and extending under said marker arm, said cradle having a crank to which one end of the hydraulic cylinder is pivotally connected.

3. A row marker apparatus comprising a frame, a marker arm pivoted in said frame, a marker disc mounted on the end of said marker, arm, means to raise said marker arm from an operating range to a stowed position, and loading means connected between said frame and said marker arm for augmenting the force by which gravity urges the marker arm and disc toward the ground, said loading means including means responsive to the position of said arm for supplying a continuously increasing downward movement on said marker arm in response to downward movement of said arm in its operating range.

4. A row marker apparatus adapted to be used with a mobile carrier of the type having a hydraulic and electric system and means for mounting attachments comprising: two marker units each having; a frame mounted on the mobile carrier, a marker arm, a marker disc mounted on said marker arm means pivotally mounting said marker arm on said frame for movement between a stowed position and a working position, latch means between the frame and said marker arm for retaining said marker arm in said stowed position, lifting means between the frame and said marker arm for raising said marker arm to said stowed position, loading means attached to said marker arm to apply a downward moment on the marker arm in its working range and operably connected to said frame such that the downward moment is significantly reduced as said marker arm is raised above said working range by said lifting means, a hydraulic cylinder pivotally mounted between said lifting means and said frame, electrically actuated release means for said latch means; switch means for individually actuating each of said release means, electrical conduit operably connecting said control means to said release means and said electrical system of the mobile carrier; hydraulic conduit dependently connecting said hydraulic cylinders to said hydraulic system of the mobile carrier simultaneously actuating said lifting means in response to fluid pressure from said hydraulic system, the respective marker arm and lifting means being effective to lower due to their weight forcing the hydraulic fluid back to the reservoir of said hydraulic system when released and said fluid pressure being disengaged, said loading means forcing said marker disc against the ground, said lifting means continuing to lower freeing the marker arm of any downward resistance from the lifting means in the marker arm working range.

5. The apparatus of claim 10 wherein said release means comprises a solenoid connected to said latch means.

6. A row marker apparatus comprising a frame, a marker arm pivoted on the frame, a marker disc mounted on the marker arm, hydraulic means for raising the marker arm from an operating range to a stowed position, and loading means operably connected between the frame and the marker arm for applying a continuously increasing downward moment on the marker arm in response to downward movement of the arm in its operating range; said loading means including a lever mounted on the marker arm, a link pivotally attached to the lever at a point displaced from said marker arm pivot, and having a length substantially equal to said displacement, and a spring mounted between the link and the frame.

7. A row marker apparatus adapted to be used with a mobile carrier of the type having a hydraulic system and means for mounting attachments, comprising a frame mounted on the mobile carrier, a marker arm, a marker disc mounted on the outer end of the marker arm, means for pivotally mounting the marker arm on the frame for movement between an operating range and stowed position, a hydraulic cylinder pivotally mounted at one end on the frame, mean operably connecting the hydraulic cylinder to the hydraulic system of the mobile carrier, lifting means pivotally mounted on said frame for motion independent of said marker arm and pivotally connected to the other end of the hydraulic cylinder, said lifting means engaging and raising said marker arm from the operating range to the stowed position when fluid pressure is applied to actuate said hydraulic cylinder in one direction, means for causing withdrawal of said lifting means from engagement with the marker arm for accommodating free downward movement of the arm in the operating range when said actuating pressure on the hydraulic cylinder is released, and loading means for applying an increasing downward moment on the marker arm in response to downward movement of the arm in its operating range.

PO-1050
(5/69)

UNITED STATES PATENT OFFICE
CERTIFICATE OF CORRECTION

Patent No. 3,556,226        Dated January 19, 1971

Inventor(s) WILLIE F. BREWER ET AL

It is certified that error appears in the above-identified patent and that said Letters Patent are hereby corrected as shown below:

Column 6, line 45:     change "10" to --4--.

Signed and sealed this 2nd day of November 1971.

(SEAL)
Attest:

EDWARD M. FLETCHER, JR.
Attesting Officer

ROBERT GOTTSCHALK
Acting Commissioner of Patent